(12) United States Patent
Rosu (10) Patent No.: US 8,893,306 B2
(45) Date of Patent: Nov. 18, 2014

(54) RESOURCE MANAGEMENT AND SECURITY SYSTEM

(75) Inventor: Marcel C. Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 12/872,996

(22) Filed: Aug. 31, 2010

(65) Prior Publication Data

US 2012/0054877 A1    Mar. 1, 2012

(51) Int. Cl.
| | | |
|---|---|---|
| G06F 7/04 | (2006.01) | |
| G06F 9/54 | (2006.01) | |
| G06F 21/57 | (2013.01) | |
| G06F 9/455 | (2006.01) | |

(52) U.S. Cl.
CPC ............... *G06F 9/545* (2013.01); *G06F 21/57* (2013.01); *G06F 9/45545* (2013.01)
USPC ................................................. 726/30; 711/6

(58) Field of Classification Search
USPC ............... 710/262, 308; 711/6, 205; 719/324; 726/30; 718/102
See application file for complete search history.

(56) References Cited

U.S. PATENT DOCUMENTS

| | | | |
|---|---|---|---|
| 7,395,496 B2 | 7/2008 | Peretz et al. ................... 714/807 |
| 7,506,122 B1* | 3/2009 | Agesen et al. ................. 711/163 |
| 7,519,814 B2* | 4/2009 | Rochette et al. .............. 713/167 |
| 7,606,965 B2* | 10/2009 | Njoku et al. ................... 710/316 |
| 7,937,700 B1 | 5/2011 | Klaiber et al. .................... 718/1 |
| 8,151,032 B2* | 4/2012 | Oshins ............................. 711/6 |
| 2002/0042807 A1 | 4/2002 | Thomas et al. .................... 709/1 |
| 2005/0108516 A1 | 5/2005 | Balzer et al. .................. 713/150 |
| 2006/0179177 A1* | 8/2006 | Arndt et al. ..................... 710/22 |
| 2007/0011272 A1* | 1/2007 | Bakke et al. .................. 709/217 |
| 2007/0198998 A1 | 8/2007 | Chen et al. .................... 719/328 |
| 2008/0127201 A1 | 5/2008 | Mori et al. .................... 718/108 |
| 2008/0184229 A1* | 7/2008 | Rosu et al. ........................ 718/1 |
| 2008/0263554 A1* | 10/2008 | Rosu et al. .................... 718/102 |
| 2010/0281273 A1* | 11/2010 | Lee et al. ....................... 713/190 |
| 2011/0145833 A1* | 6/2011 | De Los Reyes et al. ...... 718/106 |
| 2011/0265164 A1* | 10/2011 | Lucovsky et al. ................. 726/7 |

OTHER PUBLICATIONS

Wikipedia, IOMMU, http://en.wikipedia.org/w/index.php?title=IOMMU&oldid=367587652 (Jun. 26, 2012).*
Gaurav Somani & Sanjay Chaudhary, Application Performance Isolation in Virtualization, Cloud Computing, 2009, 41-8, Sep. 21-25, 2009.*
VirtualBox, VirtualBox Manual, Http://www.virtualbox.org/manual/ch10.html (last visited Nov. 15, 2012).*

* cited by examiner

*Primary Examiner* — Aravind Moorthy
*Assistant Examiner* — Jason Plotkin
(74) *Attorney, Agent, or Firm* — Ido Tuchman; William J. Stock (57) ABSTRACT

A system to address resource management and security in a computer system may include an operating system kernel executing on a computer processor. The system may also include a data processing application and a mediator configured to execute on the computer processor. The mediator may operate between the operating system kernel and the data processing application. The mediator may control access of user generated state data of the data processing application and may restrict access of the operating system kernel to the user generated state data.

22 Claims, 9 Drawing Sheets

RESOURCE MANAGEMENT AND SECURITY SYSTEM

CROSS-REFERENCE TO RELATED APPLICATIONS

This application contains subject matter related to the following co-pending applications entitled "FILESYSTEM MANAGEMENT AND SECURITY SYSTEM" and "PROCESSOR SUPPORT FOR SECURE DEVICE DRIVER ARCHITECTURE", the entire subject matters of which are incorporated herein by reference in their entirety. The aforementioned applications are assigned to the same assignee as this application, International Business Machines Corporation of Armonk, N.Y.

BACKGROUND OF THE INVENTION

1. Field of the Invention

The invention relates to the field of computer systems, and, more particularly, to address resource management and security of such.

2. Description of Background

Most general purpose computers utilize an operating system ("OS") as an interface between their applications and the computer hardware. As such, the OS usually manages data processing application programs executing on the computer as well as controlling the hardware resources responsive to the data application programs. A data processing application is an application that processes data. A user application may be a data processing application that processes data directly in support of one of the computer's users. A system application may be a data processing application processing data in support of one or multiple user or system applications running on the same or a remote system. System applications are typically implemented as user-level application running with special privileges and commonly referred to as system daemons.

In addition, the portion of the OS that may control other portion of the OS is usually called the OS kernel. The OS kernel usually has complete access to the application address space and files.

SUMMARY OF THE INVENTION

According to one embodiment of the invention, a system to address resource management and security in a computer system may include an operating system kernel executing on a computer processor.

A system to address resource management and security in a computer system may include an operating system kernel executing on a computer processor. The system may also include a data processing application, and a mediator configured to execute on the computer processor. The mediator may operate between the operating system kernel and the data processing application. The mediator may control access of user-related application state of the data processing application and may restrict access of the operating system kernel to the user-related application state.

The user-related application state may comprise data read from devices attached to the system or external to it, or data produced by the data processing application during its operation and which may be visible to the mediator and may not be visible to the operating system kernel. The operating system kernel may control system-related application state that is used to control portions of the data processing application at the operating system kernel's level.

The operating system kernel may be modified to relinquish a portion of its functionality to the mediator. The system may further include data processing resources in communication with the computer processor.

The mediator may have higher access rights than the operating system kernel to the computer processor and the data processing resources. The operating system kernel may have restricted access to user-related application state because the mediator performs transfers between the user-related state and data structures of the operating system kernel as needed to enable the operating system kernel's remaining functions.

The mediator may control system calls and exceptions between the operating system kernel and the data processing application. The data processing resources may include a computer memory, communication network, input/output and data processing devices, wherein the computer memory stores the data processing applications, the mediator, the operating system kernel, one or more shared user-level libraries and system daemons, and mediator may use the memory management unit to control memory accesses by the operating system kernel, data processing application, shared user-level libraries and system daemons; and the mediator may virtualizes select registers of the input/output devices and may use an input/output memory management unit to control data transfer sources and data transfer destinations to and from input/output devices. The system may further include an Internet protocol security module implemented as a system daemon and running outside of the operating system kernel to directly communicate with the data processing application without communicating with the operating system kernel.

Another aspect of the invention is a method to address resource management and security in a computer system. The method may include executing a mediator via a computer processor to execute between an operating system kernel and a data processing application. The method may also include controlling access to user-related application state of the data processing application via the mediator. The method may further include restricting access of the operating system kernel to the user-related application state.

The method may additionally include limiting the user-related application state to data produced by the data processing application during its operation and which is visible to the mediator and not visible to the operating system kernel. The method may further include limiting the user-related application state to data read from devices attached to the system or external to the system by the data processing application during its operation and which is visible to the mediator and not visible to the operating system kernel. The method may further include controlling, via the operating system kernel, system-related application state that is used to control portions of the data processing application at the operating system kernel's level.

The method may additionally include granting the mediator higher access rights than the operating system kernel to the computer processor and data processing resources. The method may also include controlling, via the mediator, system calls and exceptions between the operating system kernel and the data processing application. The method may further include providing an Internet protocol security module running outside of the operating system kernel to directly communicate with the data processing application without communicating with the operating system kernel.

Another aspect of the invention is a computer readable program codes coupled to tangible media to address resource management and security in a data processing system. The computer readable program codes may be configured to cause the program to execute a mediator via a computer processor to execute between an operating system kernel and a data processing application. The computer readable program codes may also control access of user-related application state of the data processing application via the mediator. The computer readable program codes may additionally restrict access of the operating system kernel to the user-related application state.

In one embodiment, the system may include an operating system kernel executing on a computer processor. The system may also include a data processing application, and a mediator configured to execute on the computer processor. The mediator may operate between the operating system kernel and the data processing application. The mediator may control access of user-related application state of the data processing application and restrict access of the operating system kernel to the user-related application state. The user-related application state may comprise data produced by the data processing application during its operation and which may be visible to the mediator and may not be visible to the operating system kernel. In addition, the mediator may have higher access rights than the operating system kernel to the computer processor.

DETAILED DESCRIPTION OF THE INVENTION

Figure 1:
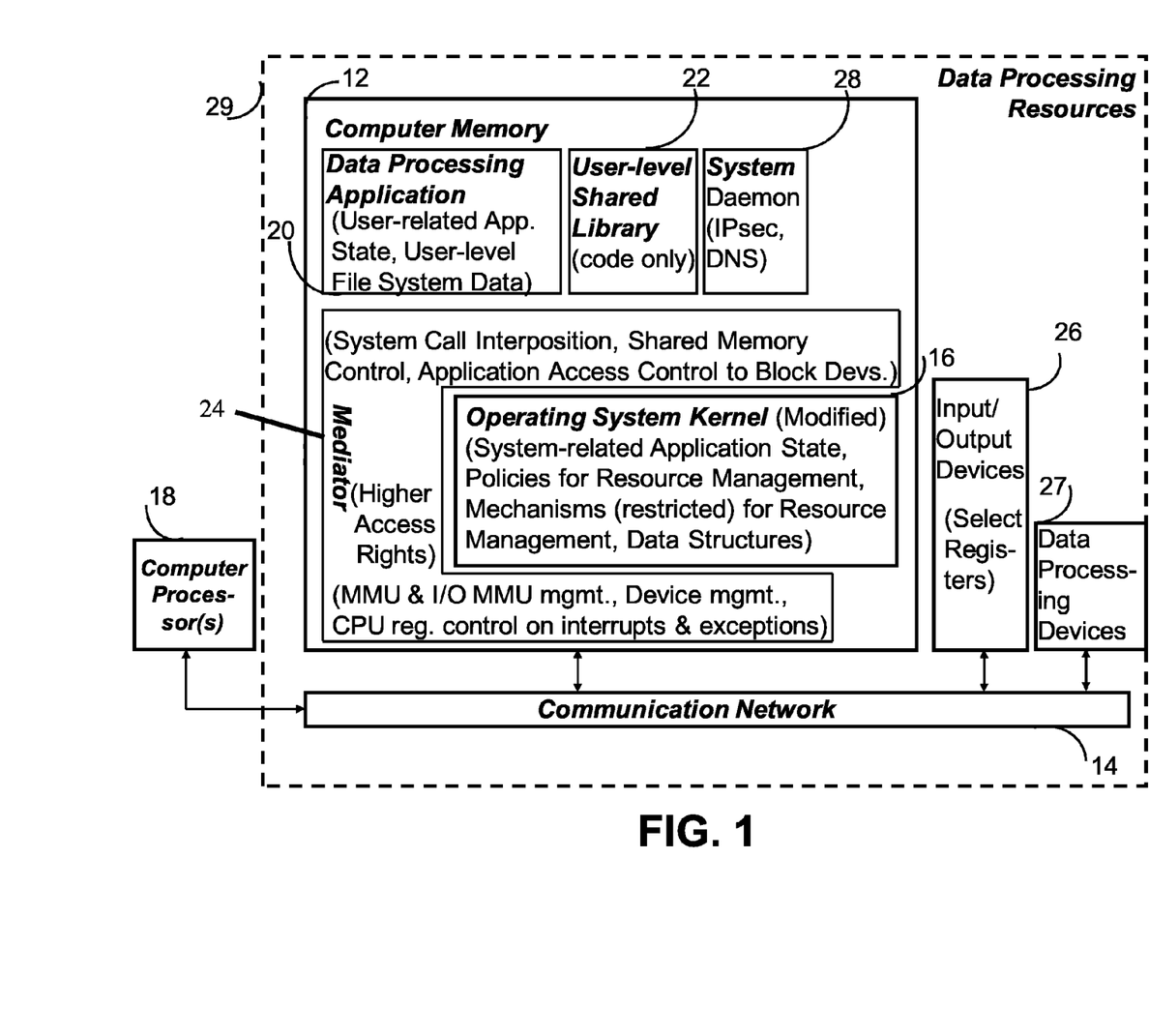
FIG. 1 is a schematic block diagram of a system to address resource management and security in a computer system in accordance with the invention.

With reference now to FIG. 1, a system 10 to address resource management and security in a computer system is initially described. The system 10 is a programmable apparatus that stores and manipulates data according to an instruction set as will be appreciated by those of skill in the art.

In one embodiment, the system 10 includes a communications network 14, which enables a signal to travel anywhere within system 10 between computer processor(s) 18 and the data processing resources 29 of system 10 and/or between data processing resources 18 or system 10 such as computer memory 12, input/output devices 26 and other data processing devices 27. The communications network 14 is wired and/or wireless, for example. The communications network 14 is local and/or global with respect to system 10, for instance.

According to one embodiment, the system 10 includes an operating system kernel 16 executing on a computer processor 18. In an embodiment, the system 10 includes a data processing application 20.

In one embodiment, the system includes a mediator 24 configured to execute on the computer processor 18. In one embodiment, the mediator operates between the operating system kernel and the data processing application. In one embodiment, the mediator 24 controls access to user-related application state of the data processing application 20 and restricts access of the operating system kernel 16 to the user-related application state.

In one embodiment, the mediator 24 restricts access of the operating system (1) directly, by taking over the control of the Memory Management Unit (MMU) from the operating system kernel 16, and (2) indirectly, by taking over the control of the I/O MMU or of any devices that have access to the system memory directly, without their accesses being controlled by the I/O MMU, from the modified operating system and related device drivers. In an embodiment, the mediator 24 programs the MMU such that any attempt by the modified operating system kernel 16 to access application memory is validated by mediator code or redirected to a mediator buffer and forwarded by the mediator to the application. In one embodiment, the mediator 24 validates any attempts by any I/O device 26 driver, included in the kernel, to program the I/O MMU and while drivers for devices not using the I/O MMU are rewritten or tested to a higher level such that they can be included in the mediator code base.

In one embodiment, the user-related application state comprises data produced by the data processing application 20 during its operation and which is visible to the mediator 24 and is not visible to the operating system kernel 16. In one embodiment, the user-related application state comprises data read from devices attached to system 10 or external to system 10, and accessible using I/O devices 26 such as a wired or wireless network interface. In one embodiment, the operating system kernel 16 controls system-related application state that is used to control portions of the data processing application 20 at the operating system kernel's level.

In one embodiment, the operating system kernel 16 is modified to relinquish a portion of its functionality to the mediator 24. In one embodiment, the system 10 further includes data processing resources 29 in communication with the computer processor 18. Data processing resources 22 include any resource used by system 10 and/or any other computer system during the input, output, storage, manipulation of data, transfer of data, or the like.

In one embodiment, the mediator 24 has higher access rights than the operating system kernel 16 to the computer processor 18 and the data processing resources 22. In one embodiment, the operating system kernel 16 has restricted access to user-related application state because the mediator 24 performs transfers between the user-related application state and data structures of the operating system kernel as needed to enable the operating system kernel's remaining functions.

In one embodiment, the mediator 24 controls system calls and exceptions between the operating system kernel 16 and the data processing application 20. In one embodiment, the data processing resources 22 include computer memory 12, communication network 14, input/output devices 26 and data processing devices 27, such as crypto co-processors or temperature monitoring sensors, wherein the computer memory 12 stores the data processing application 20, the mediator 24, operating system kernel 16, a shared user-level library 22 and a system daemon 28.

In one embodiment, the mediator 24 controls access of operating system 16, data processing application 20, user-level shared library 22 and system daemon 28 to the computer memory 12 using the memory management unit of the processor 18. In one embodiment, the mediator 25 virtualizes select registers of the input/output devices 26. In one embodiment, the mediator 24 uses an input/output memory management unit of computer processor 18 to control data transfer sources and data transfer destinations to and from input/output devices 26. In one embodiment, the system 10 further includes an Internet protocol security module implemented as a system daemon 28 and running outside of the operating system kernel 16 to directly communicate with the data processing application 20 without communicating with the operating system kernel.

Figure 2:
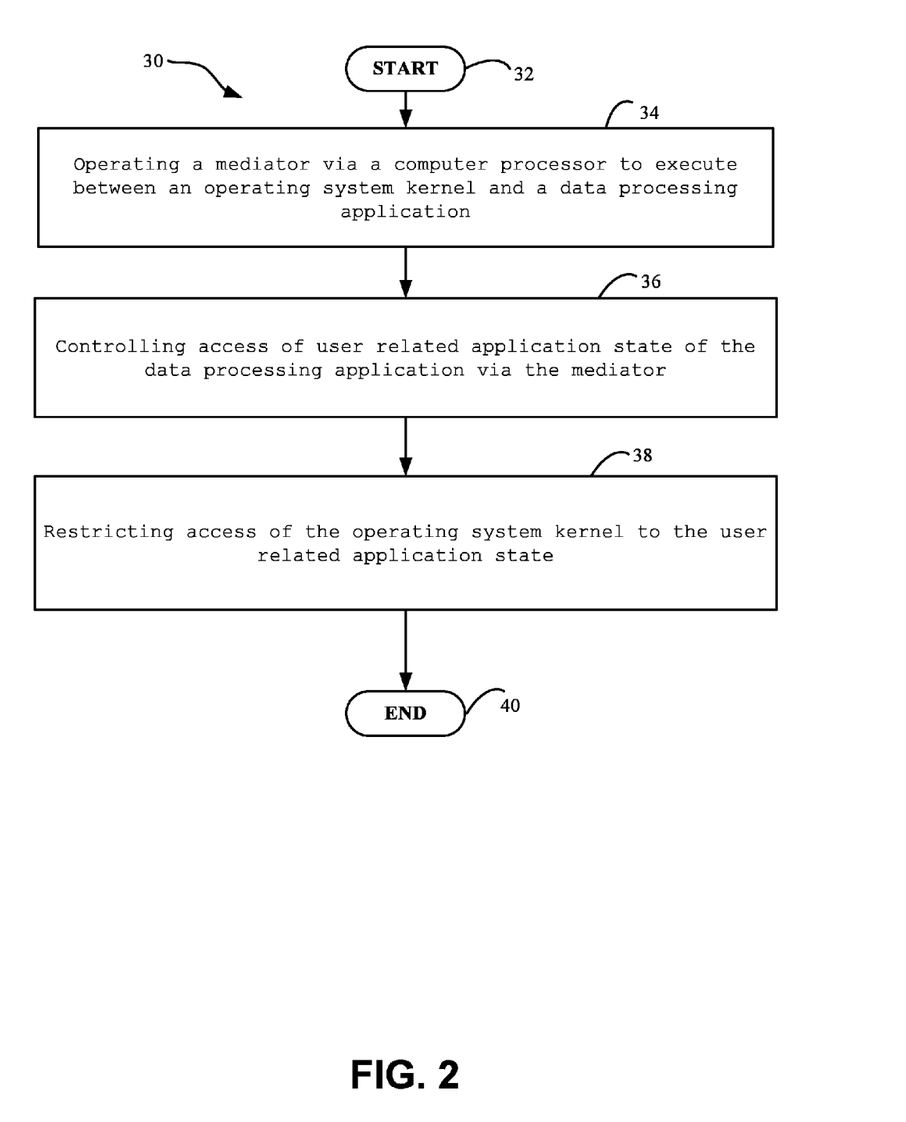
FIG. 2 is a flowchart illustrating method aspects according to the invention.

Another aspect of the invention is a method to address resource management and security in a computer system, which is now described with reference to flowchart 30 of FIG. 2. The method begins at Block 32 and may include executing a mediator via a computer processor to execute between an operating system kernel and a data processing application at Block 34. The method may also include controlling access of user-related application state of the data processing application via the mediator at Block 36. The method may further include restricting access of the operating system kernel to the user-related application state at Block 38. The method ends at Block 40.

Figure 3:
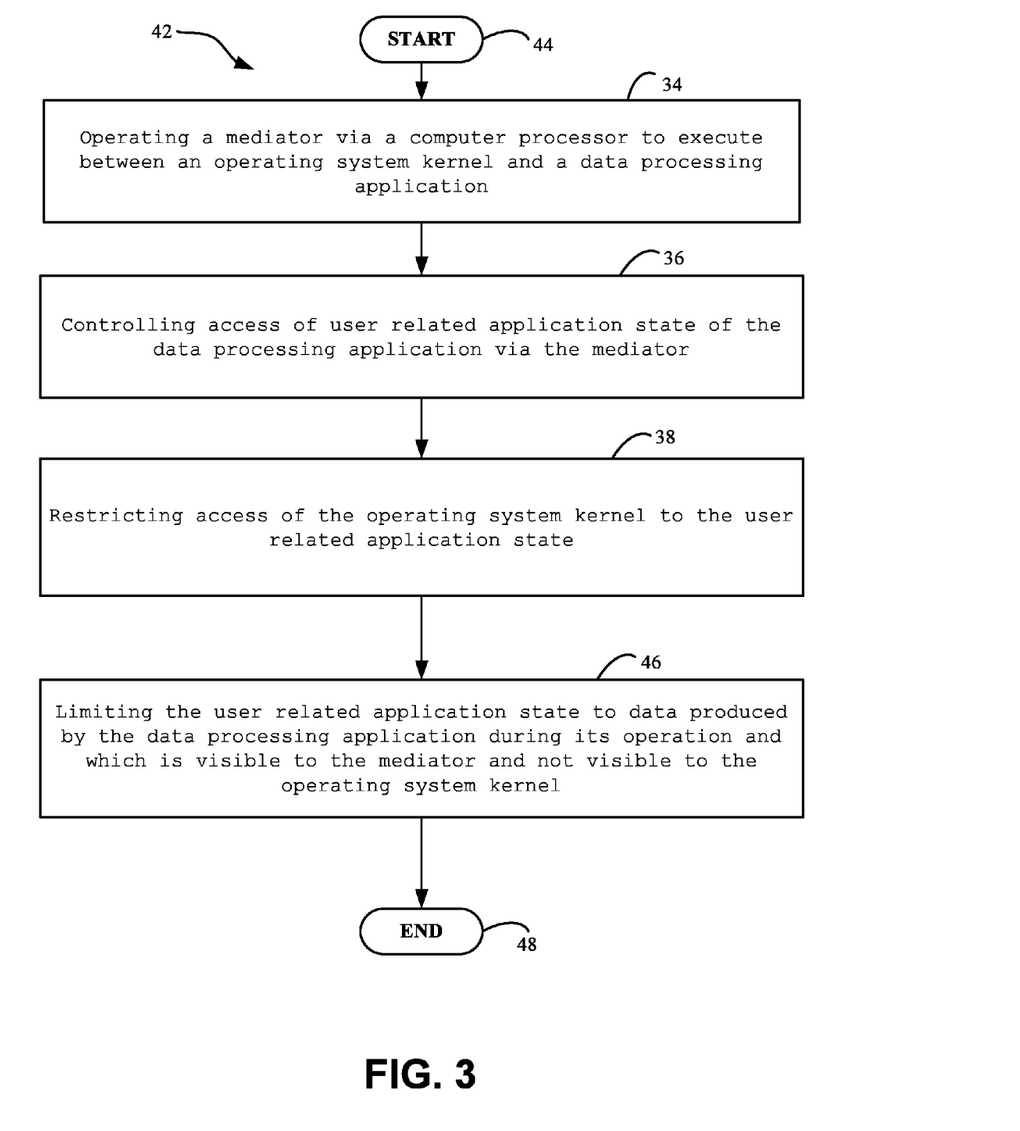
FIG. 3 is a flowchart illustrating method aspects according to the method of FIG. 2.

In another method embodiment, which is now described with reference to flowchart 42 of FIG. 3, the method begins at Block 44. The method may include the steps of FIG. 2 at Blocks 34, 36, and 38. The method may additionally include limiting the user-related application state to data produced by the data processing application during its operation and which is visible to the mediator and not visible to the operating system kernel at Block 46. The method may additionally include limiting the user-related application state to data read from a device attached to system 10 or external to it and which data read is visible to the mediator and not visible to the operating system kernel at Block 47. The method ends at Block 48.

Figure 4:
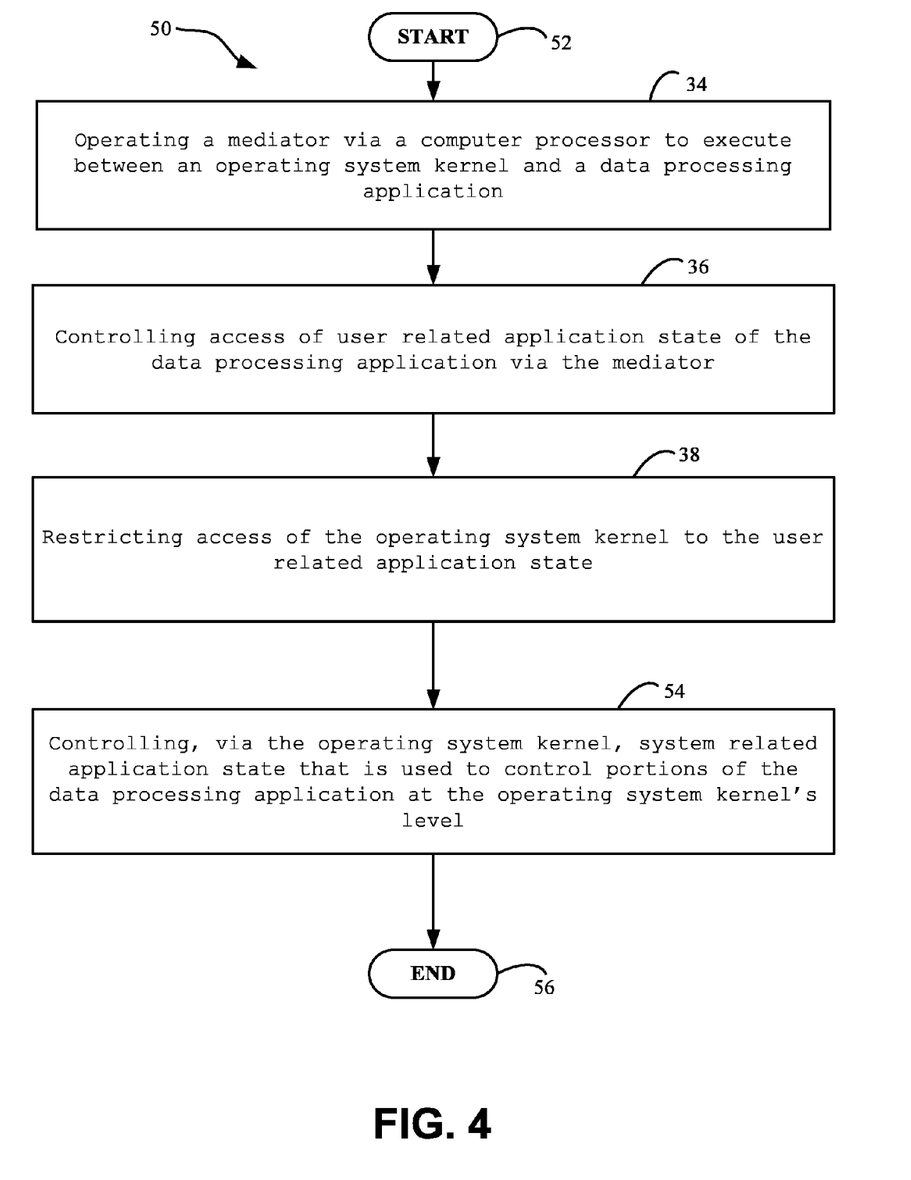
FIG. 4 is a flowchart illustrating method aspects according to the method of FIG. 2.

In another method embodiment, which is now described with reference to flowchart 50 of FIG. 4, the method begins at Block 52. The method may include the steps of FIG. 2 at Blocks 34, 36, and 38. The method may also include controlling, via the operating system kernel, system-related application state that is used to control portions of the data processing application at the operating system kernel's level at Block 54. The method ends at Block 56.

Figure 5:
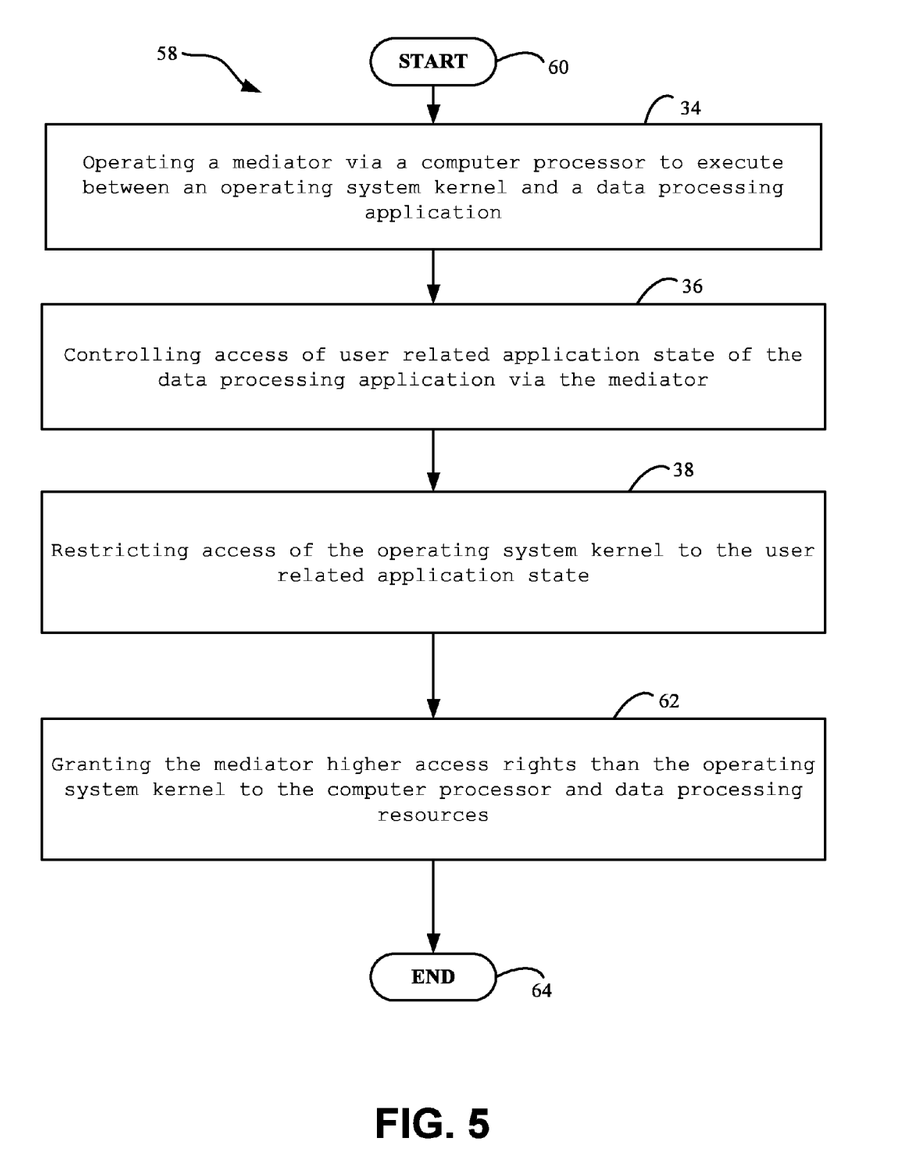
FIG. 5 is a flowchart illustrating method aspects according to the method of FIG. 2.

In another method embodiment, which is now described with reference to flowchart 58 of FIG. 5, the method begins at Block 60. The method may include the steps of FIG. 2 at Blocks 34, 36, and 38. The method may further include granting the mediator higher access rights than the operating system kernel to the computer processor and data processing resources at Block 62. The method ends at Block 64.

Figure 6:
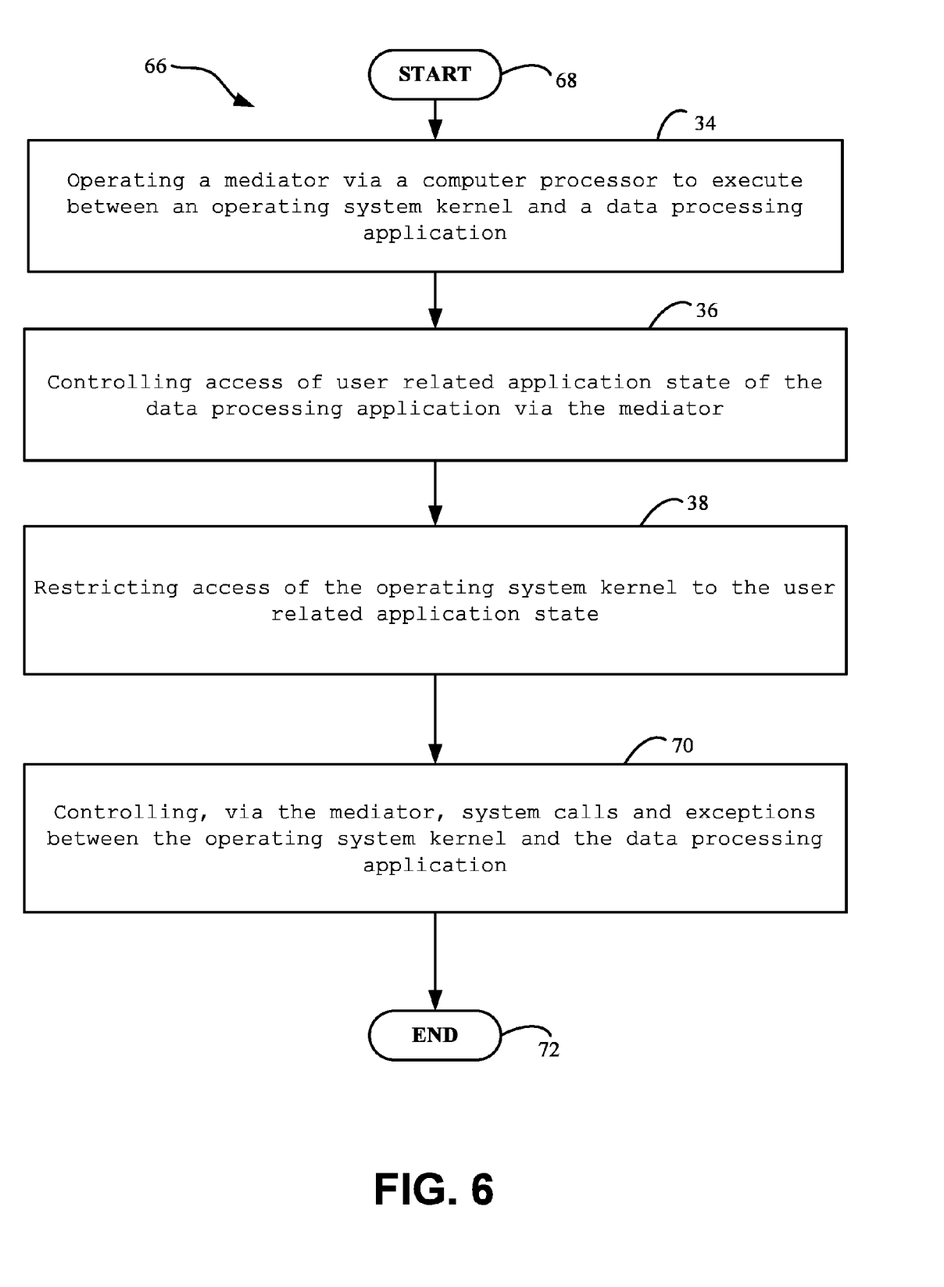
FIG. 6 is a flowchart illustrating method aspects according to the method of FIG. 2.

In another method embodiment, which is now described with reference to flowchart 66 of FIG. 6, the method begins at Block 68. The method may include the steps of FIG. 2 at Blocks 34, 36, and 38. The method may further include controlling, via the mediator, system calls and exceptions between the operating system kernel and the data processing application at Block 70. The method ends at Block 72.

Figure 7:
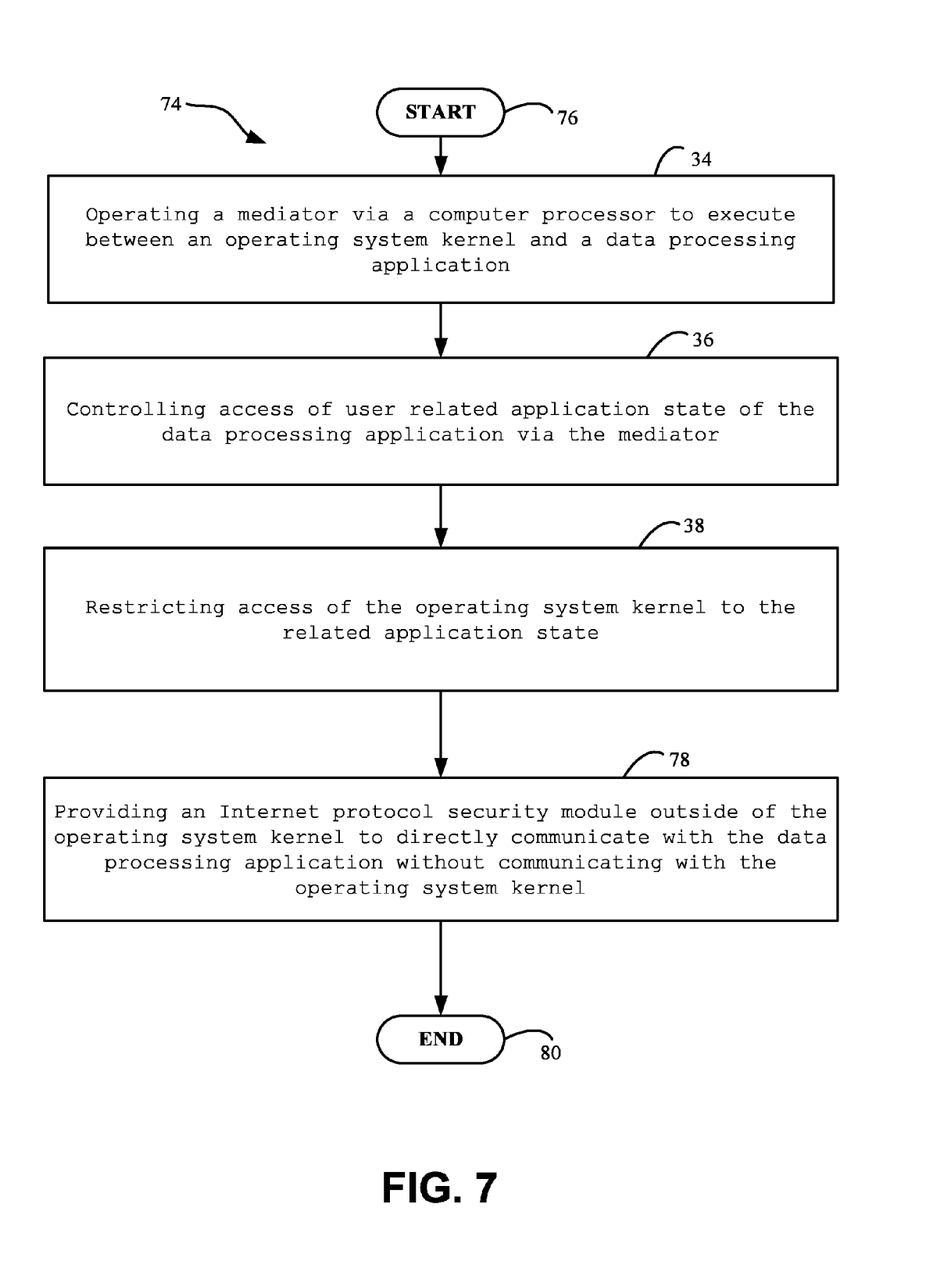
FIG. 7 is a flowchart illustrating method aspects according to the method of FIG. 2.

In another method embodiment, which is now described with reference to flowchart 74 of FIG. 7, the method begins at Block 76. The method may include the steps of FIG. 2 at Blocks 34, 36, and 38. The method may further include providing an Internet protocol security module implemented as a system daemon and running outside of the operating system kernel to directly communicate with the data processing application without communicating with the operating system kernel at Block 78. The method ends at Block 80.

Figure 8:
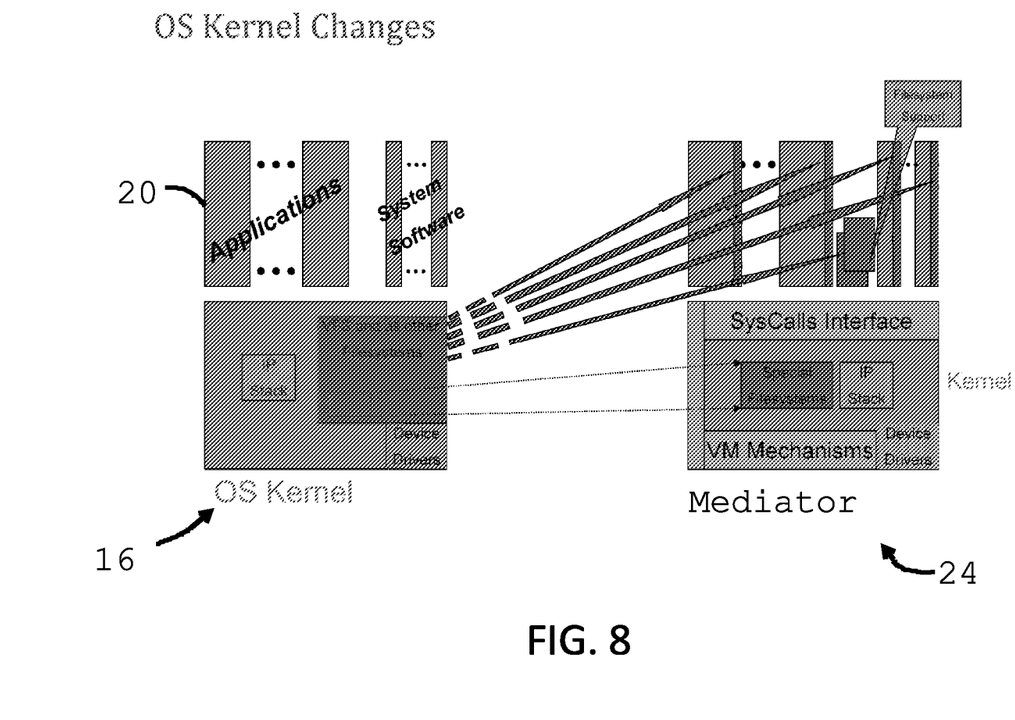
FIG. 8 is a schematic block diagram of OS kernel changes in accordance with the invention.

Another aspect of the invention is a computer readable program codes coupled to tangible media to address resource management and security in a data processing system shown in FIG. 8. In one embodiment, the computer readable program codes is configured to cause the program to execute a mediator 24 via a computer processor 18 to execute between an operating system kernel 16 and a data processing application 20. In one embodiment, the computer readable program codes also controls access of user-related application state of the data processing application 20 via the mediator 24. In one embodiment, the computer readable program codes restrict access of the operating system kernel 16 to the user-related application state.

In one embodiment, the system includes an operating system kernel 16 executing on a computer processor 18. In one embodiment, the system 10 also includes a data processing application 20, and a mediator 24 configured to execute on the computer processor 18.

In one embodiment, the mediator 24 operates between the operating system kernel 16 and the data processing application 20. In one embodiment, the mediator 24 controls access of user-related application state of the data processing application 20 and restrict access of the operating system kernel 16 to the user-related application state.

In one embodiment, the user-related application state comprises data produced by the data processing application 20 during its operation and which is visible to the mediator 24 and is not visible to the operating system kernel 16. In one embodiment, the user-related application state comprises data read from a device attached to system 10 or external to it and which is visible to the mediator 24 and is not visible to the operating system kernel 16. In one embodiment, the mediator 24 has higher access rights than the operating system kernel 16 to the computer processor 18. In one embodiment, user state protected by the mediator 24 is divided into (1) state generated by the application during its execution, and (2) state read into the application address space, basically the application code, the initial values for its variables and all its input.

In view of the foregoing, the system 10 addresses resource management and security in a computer system, for example. For instance, commercial operating systems ("OSes") are large and complex. So far, attempts to prove them correct against a comprehensive set of specifications have failed. In addition, over the past years, all/most of them have been compromised by network-initiated attacks.

In addition, there is no prior disclosure of a computer and OS architecture that separates the resource protection from the resource management functions of an operating system. More specifically, there is no prior disclosure of an architecture in which compromises of the operating system will only result in applications 20 being denied access to the computer data processing resources 29 and computer processor 18 that they need, and normally have access to, without any loss of application 20 data or compromise of the application code and data, for instance.

In one embodiment, system 10 may utilize: (1) minimal changes to the kernels 16 of existing commercial OSes and to the existing processor/chipset 18 architectures, (2) the addition of a small and trusted system software component 24 that can be proved correct, and (3) minimal changes to the rest of the system software and to the applications 20, preferably restricted to modifications of the system libraries used to interface applications with the kernel and with the new trusted system software component, for example.

In one embodiment, kernel code is part of the OS kernel in commercial or academic operating systems. It runs with super-user privileges and it provides support to all (user and system) applications running on the underlying computer system 10. Super-user mode is the most privileged level at which software runs on a typical computer systems with no hardware support for virtualization or with such support disabled. Software running in the most privileged mode has access to all the hardware resources of the system 10. In system 10, the mediator 24 code is run in the most privileged level and the modified kernel code is run in a mode with slightly fewer privileges. This means that the mediator 24 code has access to all the hardware resources, the modified kernel 16 has access to fewer hardware resources than the mediator (and also less than the original kernel had access to in the unmodified/original computer system) and applications are run in a mode with even fewer privileges than the modified kernel code.

Recent efforts in the art are based on a radically different hardware architecture, which requires massive changes to existing operating system and application implementations or require a Virtual Machine Monitor to encapsulate an unmodified kernel and minimally changed applications. Both approaches depend heavily on cryptography, exhibit significant performance degradations and do not fully protect the data in the local file system. Older approaches require an entirely new operating system implementation and have never been successfully tested on large installations.

With additional reference to FIG. 8, in one embodiment of the proposed architecture, the modified operating system kernel 16 has no access to the state (address space plus registers) of any of the applications 20 it runs, and its access to the local file system may be restricted to the file(s) it really needs access to (for instance, the current Linux kernel only needs access to one of the /sbin/init, /etc/init, /bin/sh, or /bin/init application file to properly start).

In one embodiment, the interface between applications 20 and kernel 16, which includes system calls and exceptions, is mediated by a small layer of software that runs at a higher privilege level than the kernel. This trusted software component, called mediator 24, uses a memory management unit ("MMU") to restrict kernel access to the address spaces of local applications 20, and it is designed to reduce the number of kernel 16 code changes.

Figure 9:
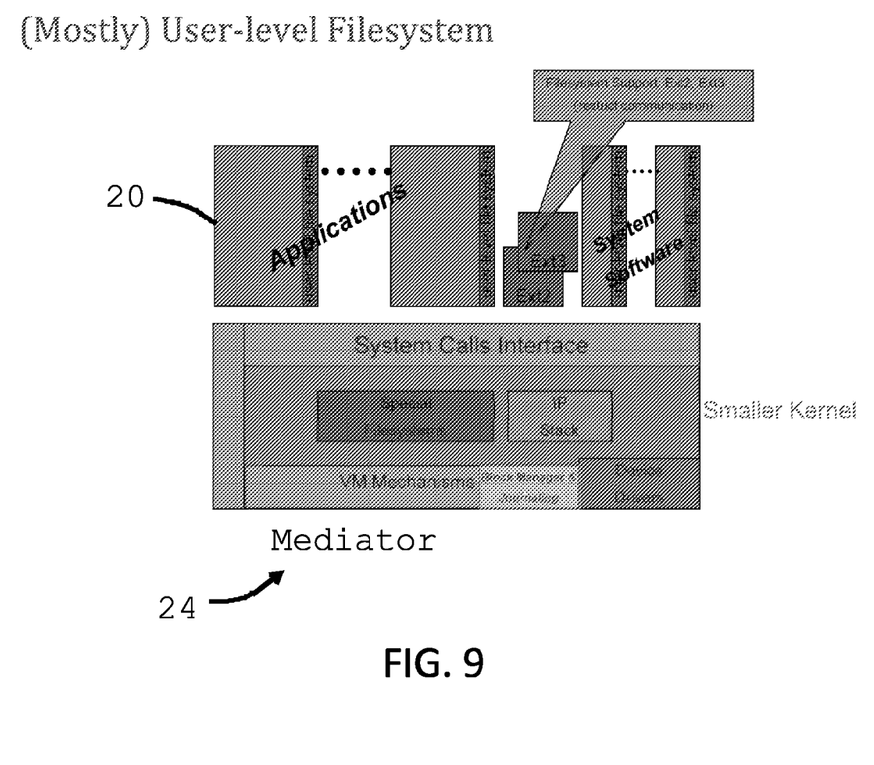
FIG. 9 is a schematic block diagram of user-level filesystem in accordance with the invention.

In one embodiment, the file system implementation is largely removed from the kernel 16, which has access only to a small portion of the root file system, such as the /sbin/init program. File systems for local block devices are implemented in shared, user-level libraries, with the kernel-resident block device drivers controlling the devices, but mediator 24 controlling the source and destinations of data transfers from and to these devices by using an (possibly) enhanced input/output memory management unit ("IOMMU") and by virtualizing select registers of the attached block-device controllers.

In one embodiment, the architecture prevents the kernel 16 from accessing the application 20 state stored in the processor 18 registers even when servicing an interrupt taken while executing application 20 code. In contrast, existing architectures save the processor state in the kernel address space while servicing an interrupt, which allows a compromised kernel to access the application state stored in the processor registers and to load tainted values in these registers upon returning from interrupt.

In one embodiment, the Internet Protocol Security 28 ("IPsec") implementation is removed from the kernel 16 into a dedicated, user-level system application (daemon), which communicates with the local applications 20 directly, without kernel intermediation, using shared memory 22. In one embodiment, applications 20 using IPsec 28 will use library implementations for the higher layers of the networking stack. In one embodiment, the original network stack remains in the kernel 16, as applications 20 are expected to use secure sockets layer ("SSL") for most of their sensitive network communication, for instance.

In one embodiment, system 10 architecture does not use encryption to protect application 20 data from being accessed by the OS kernel 16 or by other (system or not) applications 20, for instance. For example, system 10 does not aim at improving the kernel 16's resilience to attacks, but it aims at preventing the attacker from accessing application 20 data once it takes control of the kernel because the mediator 24 cannot be compromised.

In one embodiment, system 10 requires modest changes to the existing kernel 16 and system software 20 and small extensions to existing processor architectures to achieve this goal. In one embodiment, each of the software or hardware mechanisms, such as but not limited to, additional privilege level with fast and secure control transfer to lower/kernel level and supervising the access to and from attached block devices based on block or superblock access rights, secure interrupt state save and restore in hardware, user-level distributed file system implementation, and an enhanced IOMMU architecture, all of which may be used by system 10, are the subject of related but separate disclosures.

In one embodiment, mediator 24 is a relatively small software component that has simultaneous access to the kernel 16 and current application 20 address spaces and it mediates parameter and result passing for system calls. In one embodiment, application 20 registers, which include the application return address, are saved in the mediator 24's local memory.

In one embodiment, the mediator 24 code prepares a stack entry in the kernel 16 address space for the system call code and switches the processor 18 to the kernel, i.e., lower, privilege level to start executing the system call code. In one embodiment, to safely transfer the control to a lower privilege code and back, the processor 18 architecture may have to be enhanced with mechanisms that ensure that the system call will eventually return to mediator 24 as specified by its semantics. More specifically, the fork( )/clone( ) and abort( )/exit( ) system calls may require two or no return paths to be set-up by mediator 24 while the rest of the system calls typically require only one.

In one embodiment, mediator 24 intermediates exception handling as well. In one embodiment, mediator 24 is responsible for the virtualization of the local memory, checking (and modifying) the process tables maintained by the OS kernel 16.

In an alternative implementation on recent (x86) processor architectures, mediator 24 can take advantage of their enhanced MMU's designed for efficient virtualization (AMD's Nested Page Tables and Intel's Extended Page Tables). This approach may reduce the OS kernel 16 changes required to protect the application 20 state from a compromised kernel, but the resulting system 10 may not be hosted (efficiently) by a hardware-enabled virtual machine monitor ("VMM").

In existing OS kernels, when the processor takes an interrupt while executing application code, i.e., while in User Mode, the application registers are saved in kernel address space. A compromised kernel can access these values or resume the interrupted application with tainted register values, including program counter and stack pointer, designed to modify the application behavior towards revealing more of its state to the attacker.

The system 10 architecture includes several alternatives, including but not limited to running the bottom half of the interrupt handler in mediator 24 address space, or modifying the processor 18 to (1) encrypt and decrypt registers automatically, after taking an interrupt and before resuming the application 20, respectively, or (2) to use memory locations not accessible to the kernel 16 for storing the application state upon servicing the interrupt (after being saved, registers must also be cleared).

In one embodiment, if debugger support is needed, instructions executing at the highest priority level may be able to read and modify the content of the saved registers. In one embodiment, when debugger support is not needed, this capability may be disabled.

In one embodiment, to prevent the OS kernel 16 from having access to application 20 data, the implementations of the supported local file systems are removed from the kernel into user-level shared libraries. In one embodiment, data blocks (from local disks or other block devices supporting a file system) are direct memory accessed directly into and from application address spaces. In one embodiment, the kernel-resident 16 device drivers program the transfer, but mediator 24 controls the source and destination of each transfer by virtualizing the IOMMU and selected registers of the block device controllers.

Towards this end, and to prevent information leakage through the swap device, mediator 24 maintains an access rights list at the block or superblock level for each attached block device. In one embodiment, between system 10 starts, this information is stored externally and its integrity protected using the same mechanisms as for the mediator 24 and kernel 16 code, possibly with dedicated tamper resistant hardware.

In one embodiment, an application-level component, which communicates directly with the applications 20, without kernel 16 mediation, handles disk blocks that may not be assigned a clear ownership, such as blocks containing metadata shared referring to data blocks owned by multiple users. The same component implements file locking services, for example.

In one embodiment, the kernel 16 keeps ownership of the network stack, as applications 20 may use SSL for secure communication. In one embodiment, kernel IPsec 28 implementations may be moved out of the kernel 16, either in a separate application or inside the mediator 24 code base and address space.

In one embodiment, an application-based 20 implementation is preferable, with mediator 24 intermediating between the IPsec 28 user-level implementation and crypto accelerator devices, if any.

In one embodiment, mediator 24 includes a serial line driver and minimal kernel 16 monitoring/debugging functionality. Even after these additions, its small size makes it more amenable to formal verification.

In one embodiment, upon system 10 initialization, mediator 24 is copied and started in main memory by a boot loader. In one embodiment, mediator 24 is responsible for initializing the modified OS kernel 16. Upon system shutdown, mediator 24 shuts down after the kernel 16, for instance.

It is noted that OS kernels have complete access to the application address space and files. As a result, a corrupted kernel exposes all the application state (internal data structures and files) to the attacker. Existing work attempts to protect the kernel from running unauthorized code or to enforce safety properties on modules running in kernel address space.

In contrast, in one embodiment, system 10 uses mediator 24, a system software component designed to work with a modified OS kernel 16 to contain its access to the address spaces of the local applications 20 and to the storage devices 22 attached to the computer system. In one embodiment, mediator 24's architecture requires modest changes to the existing kernel 16 architecture, concentrated in the application/kernel interface and virtual memory management.

In one embodiment, applications 20 running on a mediator-enabled 24 OS kernel 16 are still exposed to denial of service attacks. In this respect, mediator 24 complements ongoing efforts to enhance the reliability of the underlying OS kernel 16.

In one embodiment, mediator 24 is a relatively small system software component running at a privilege higher than the OS kernel 16 that intermediates the legitimate interactions between kernel and applications 20 and restricts all the other kernel accesses to application data (by design, applications are already prevented from accessing sensitive kernel data in existing OS architectures).

In one embodiment, the largest mediator 24 component handles system calls, exceptions and signal activation by passing parameters and results between application 20 and kernel 16 (while having access to the address spaces of both) and by unmapping the address space of the current application from the kernel address space while in kernel mode. In one embodiment, MMU management is transferred from kernel 16 to mediator 24.

In one embodiment, MMU management in mediator 24 shares certain elements with the equivalent functionality in a virtual machine monitor ("VMM"), it also protects applications 20 from a malicious kernel. Example attacks include, but are not limited to, attempting to map application pages in kernel 16 address space, establishing unrequested shared memory regions between applications 20, extending legitimate shared memory regions with the purpose of leaking information from one application to another, allocating new pages to an application without zeroing them, changing the legitimate page frames of an application, possibly as a result of a sequence of swap out/in operations, with illegitimate pages, and so on. In one embodiment, to prevent this type of attack, system 10 closely correlates the application 20's system calls and exceptions related to address-space changes, such as copy-on-write, with changes to the address space of the application and with MMU management.

In one embodiment, other mediator 24 components virtualize the locally connected storage devices by enforcing block-level access rights and prevent interrupt handlers (running in the kernel 16 address space) from accessing the application state stored in the processor 18 registers (when the processors takes an interrupt while in User Mode). In one embodiment the system 10 coordinates with the user-level file system (described in a related disclosure) to safely start a new process.

Mediator 24 includes at least one simple driver for a trusted I/O device 26, such as serial interface and basic primitives for loading and starting, restarting and monitoring kernel 16 activities and integrity.

In one embodiment, mediator 24 leverages a processor 18 execution mode with higher priority than the one used to run the OS kernel 16.

Processor architectures with only two execution modes will need to be enhanced with an additional mode to run mediator 24, for example. For processors with more than two modes, but for which the kernel 16 is configured in the highest priority mode, such as the x86 family from Intel or AMD, the kernel is either modified to run at a lower level, say one instead of zero, or mediator 24 takes advantage of the virtualization capabilities of the newer members of the x86 processor family (similarly, on non-x86 processors, mediator 24 can take advantage of hardware capabilities designed for efficient virtualization), for instance. The later approach prevents the resulting system (modified kernel 16+mediator 24 system software) from being hosted by one of the existing VMM, which is designed to takes advantage of the virtualization support added to the processor, for example.

In one embodiment, mediator 24 separates the address spaces of applications 20 and kernel 16 with small changes to the existing kernel by capturing application 20 system calls, exceptions, and signal handling. On these events, mediator 24 handles the MMU to restrict the application 20 or kernel 16 to its own address space, for instance. Based on the nature of the event, such as system 10 call invocation, system call return, exception invocation or return, signal invocation, or the like, mediator 24 in cooperation with the modified kernel 16 performs parameter and result passing between the two address spaces involved, for example.

In one embodiment, the kernel 16 is modified to transfer MMU handling to mediator 24. In one embodiment, if the processor 18 architecture provides additional, i.e., unused by the kernel 16, MMU functionality that can be leveraged to ensure address space isolation, mediator 24 can take advantage of it, which will reduce the magnitude of kernel changes, but will prevent other system 10 components, such as the VMM, from using this additional MMU functionality. In one embodiment, to reduce the extent of kernel 16 changes, mediator 24 can manage proxy objects/buffers for application-resident 20 objects/buffers and modifies pointers accordingly upon system 10 invocation.

To limit the additional system 10 call overhead, mediator 24 can include the implementation of a few short and frequently-used system calls, for example.

The transfer of control from mediator 24 to the kernel 16 upon a system 10 call or exception invocation hides from the kernel any application-related information that is not necessary for completing the invocation, such as the location in the application 20 code where the system call was invoked or where the exception triggered, for instance.

In one embodiment, mediator 24 manages all the local block devices to prevent the kernel 16 from accessing application 20 data stored in the local file system(s). In one embodiment, only the fraction of the device driver functionality handling data transfers must be transferred from the kernel-resident 16 drivers to mediator 24; device testing, initialization and shutdown can still be done by kernel-resident code.

Towards this goal, mediator 24 controls all the device registers used to configure/initiate data transfers, for instance. Mediator 24 maintains an access-rights (R/W) map for each block device to assist in data access and program launch/execution, for example.

In an alternate embodiment, IOMMU management, if present, is transferred from kernel 16 to mediator 24, while device management (device drivers), possibly after small modifications, is left to the kernel. In one embodiment, mediator 24 and kernel 16 cooperate to enable user-level DMAs, directly from disk-block to selected (pinned-down) application 20 pages. In one embodiment, protected, user-level DMA supports the library/user-level file system component of the architecture, which is the subject of a separate but related disclosure.

In one embodiment, mediator 24 protects the application 20 information captured in the processor 18 state when the processor takes an interrupt while in UserMode from being released to the kernel 16 by handling the lowest level of the interrupt processing (invocation & return), i.e. the bottom half of the interrupt service routine ("ISR") and transferring control to the kernel only after saving this information in mediator address space and clearing the registers. In alternative embodiment, a modified processor 18 architecture, which is the topic of a separate but related disclosure, can provide the same protection with virtually no negative performance impact.

Overall, mediator 24 separates the applications 20, network stack plus drivers, and the file system, for example. This is true even when the file system has a small, application-level system component (daemon), which is prevented by mediator 24 from performing any network-related system 10 call, and more generally, from performing any system calls that would leak file system-related information to a remote machine directly, or indirectly, through a potentially corrupted kernel 16, for instance.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
    a computer processor;
    an operating system kernel configured to execute on the computer processor; and
    a mediator configured to execute on the computer processor and to operate between the operating system kernel and a data processing application, the mediator to control access of user-related application state of the data processing application and to restrict access of the operating system kernel to the user-related application state;
    wherein the operating system kernel is modified to remove a portion of its functionality to the mediator; and
    wherein the mediator has higher access rights than the operating system kernel to the computer processor and the data processing resources.

2. The system of claim 1 wherein the user-related application state comprises data produced by the data processing application during its operation and which is visible to the mediator and not visible to the operating system kernel.

3. The system of claim 1 wherein the operating system kernel controls system-related application state that is used to control portions of the data processing application at the operating system kernel's level.

4. The system of claim 1 further comprising data processing resources in communication with the computer processor.

5. The system of claim 4 wherein the operating system kernel has restricted access to user-related application state because the mediator performs transfers between the user-related application state and data structures of the operating system kernel as needed to enable the operating system kernel's remaining functions.

6. The system of claim 1 wherein the mediator is configured to control system calls and exceptions between the operating system kernel and the data processing application.

7. The system of claim 6, comprising:
    data processing resources in communication with the computer processor; and
    wherein the data processing resources include computer memory, communication network, input/output devices and data processing devices, wherein the computer memory is configured to store the data processing application, mediator, operating system kernel, a shared user-level library and a system daemon; and wherein the mediator is configured to use a memory management unit to control memory access rights by the operating system kernel, the data processing application, the shared user-level library and the system daemon; and wherein the mediator is configured to virtualize select registers of input/output devices and uses an input/output memory management unit to control data transfer sources and data transfer destinations to and from input/output devices.

8. The system of claim 1 further comprising an Internet protocol security module outside of the operating system kernel configured to run as a system daemon to directly communicate with the data processing application without communicating with the operating system kernel.

9. A method comprising:
    configuring a mediator to execute between an operating system kernel and a data processing application by a computer processor;

controlling access of user related application state of the data processing application via the mediator;

restricting access of the operating system kernel to the user related application state;

modifying the operating system kernel to remove a portion of its functionality to the mediator; and granting the mediator higher access rights than the operating system kernel to the computer processor and the data processing resources.

10. The method of claim 9 further comprising configuring the user related application state as limited to data produced by the data processing application during its operation and which is visible to the mediator and not visible to the operating system kernel.

11. The method of claim 9 further comprising configuring the operating system kernel to control system related application state that is used to control portions of the data processing application at the operating system kernel's level.

12. The method of claim 9 further comprising configuring the mediator to control system calls and exceptions between the operating system kernel and the data processing application.

13. The method of claim 9 further comprising configuring an Internet protocol security module outside of the operating system kernel to directly communicate with the data processing application without communicating with the operating system kernel.

14. A computer program product embodied in a non-transitory computer readable storage medium comprising:

computer readable program codes coupled to the computer readable storage medium to address resource management and security in a data processing system, the computer readable program codes configured to cause the program to:

execute a mediator via a computer processor to execute between an operating system kernel and a data processing application;

control access of user related application state of the data processing application via the mediator;

restrict access of the operating system kernel to the user relates application state;

modify the operating system kernel to remove a portion of its functionality to the mediator; and grant the mediator higher access rights than the operating system kernel to the computer processor and the data processing resources.

15. The computer program product of claim 14 further comprising program code configured to: limit the user related application state to data produced by the data processing application during its operation and which is visible to the mediator and not visible to the operating system kernel.

16. The computer program product of claim 14 further comprising program code configured to: control, via the operating system kernel, system related application state that is used to control portions of the data processing application at the operating system kernel's level.

17. The computer program product of claim 14 further comprising program code configured to: control, via the mediator, system calls and exceptions between the operating system kernel and the data processing application.

18. The computer program product of claim 14 further comprising program code configured to: provide an Internet protocol security module outside of the operating system kernel to directly communicate with the data processing application without communicating with the operating system kernel.

19. A system comprising:

a computer processor;

an operating system kernel configured to execute on the computer processor;

a data processing application; and a mediator configured to execute on the computer processor and operating between the operating system kernel and the data processing application, the mediator configured to control access of user related application state of the data processing application and restricting access of the operating system kernel to the user related application state, the user related application state data comprises data produced by the data processing application during its operation and which is visible to the mediator and not visible to the operating system kernel, and the mediator having higher access rights than the operating system kernel to the computer processor; and wherein the operating system kernel is modified to remove a portion of its functionality to the mediator; and wherein the mediator has higher access rights than the operating system kernel to the computer processor and the data processing resources.

20. The system of claim 19 wherein the operating system kernel is configured to control system related application state that is used to control portions of the data processing application at the operating system kernel's level.

21. The system of claim 19 wherein the operating system kernel has restricted access to user related application state because the mediator performs transfers between the user related application state and data structures of the operating system kernel as needed to enable the operating system kernel's remaining functions.

22. The system of claim 19 wherein the mediator is configured to control system calls and exceptions between the operating system kernel and the data processing application.

* * * * *